United States Patent [19]

Ozin et al.

[11] Patent Number: 5,008,234

[45] Date of Patent: Apr. 16, 1991

[54] PROCESS FOR THE PREPARATION OF CATALYTIC METAL CLUSTERS

[75] Inventors: Geoffrey A. Ozin, Toronto; Helmut X. Huber, Etobicoke; Richard A. Prokopowicz; John Godber, both of Toronto, all of Canada

[73] Assignee: Her Majesty the Queen in the Right of Canada, as Represented by the Minister of Energy Mines and Resources Canada, Ottawa, Canada

[21] Appl. No.: 296,689

[22] Filed: Jan. 13, 1989

[30] Foreign Application Priority Data

Jun. 17, 1988 [CA] Canada ................................ 569838

[51] Int. Cl.$^5$ .................... B01J 23/42; B01J 23/89
[52] U.S. Cl. ........................ 502/326; 502/66; 502/259; 502/262; 502/305; 502/319; 502/321; 502/325; 502/334; 502/335; 502/337; 502/338; 502/339; 502/347; 502/350
[58] Field of Search ............. 502/262, 259, 66, 334, 502/335, 337, 339, 305, 319, 321, 325, 326, 338, 347, 350

[56] References Cited

U.S. PATENT DOCUMENTS

| | | | |
|---|---|---|---|
| 3,871,997 | 3/1975 | Sinfelt et al. | 208/139 |
| 4,272,406 | 6/1981 | Beach et al. | 585/511 |
| 4,272,407 | 6/1981 | Beach et al. | 585/511 |
| 4,292,253 | 9/1981 | Ozin et al. | 260/429.5 |
| 4,293,725 | 10/1981 | Beach et al. | 585/511 |
| 4,552,855 | 11/1985 | Ozin et al. | 502/74 |
| 4,569,924 | 2/1986 | Ozin et al. | 502/184 |
| 4,588,708 | 5/1986 | Klabunde et al. | 502/241 |
| 4,595,670 | 6/1986 | Tauster et al. | 502/74 |

FOREIGN PATENT DOCUMENTS

115697 8/1984 European Pat. Off. .
2084042 4/1982 United Kingdom .

OTHER PUBLICATIONS

Matsuo et al., *J. Org. Chem.*, 1982, vol. 47, pp. 843–848.
Choplin et al., *J. Am. Chem. Soc.*, 1986, vol. 108, pp. 4224–4225.

*Primary Examiner*—William J. Shine
*Attorney, Agent, or Firm*—Lowe, Price, Leblanc, Becker & Shur

[57] ABSTRACT

Compositions of matter useful as catalysts in heterogeneous reactions and comprising metal atom clusters supported on inorganic supports such as silica, alumina or zeolites are prepared by vaporizing the metal at low temperatures and pressures into an environment of ethylene and a gaseous inert solvent. A metal-ethylene complex, protected by solvent molecules is formed. The complex is melted to liquid phase and used to impregnate the support. Then the material is warmed to ambient temperature to remove the solvent, decompose the complex and form monatomic or clusters of metal on the support.

8 Claims, 1 Drawing Sheet

PROCESS FOR THE PREPARATION OF CATALYTIC METAL CLUSTERS

FIELD OF THE INVENTION

This invention relates to solid catalysts, of the type commonly used in performing heterogeneous phase reactions, and processes for preparation of such catalytic materials. More particularly, it relates to supported metal catalysts in which the catalytically active metal is deposited on the surface of a support in monatomic or small cluster form. It also relates to a novel process for the preparation of such catalytically active materials.

BACKGROUND OF THE INVENTION

Heterogeneous catalysis processes, using metal catalysts, are of commercial importance in a large number of chemical and petrochemical processes. Examples include hydrocarbon cracking and reforming, dehydrogenation reactions, isomerization reactions, Fischer-Tropsch processes and many others. The economic performance of such processes depends to a large extent on the activity of the catalyst, the selectivity of the catalyst towards the desired reaction product, and the cost and complexity of preparation of the catalyst in its most advantageous form for use in the particular process under consideration.

Whilst there are still scientific uncertainties about the precise nature of heterogeneous catalysis reactions, it is widely accepted that such catalysis is largely a surface phenomenon, so that most efficient catalysts should normally have large metallic surface area, achieved by producing the catalyst in very small particle form.

Recently it has been recognized that metals exhibit very high heterogeneous catalytic activity when they are present in monatomic or small cluster form, i.e. from 1 to about 100 metal atoms per cluster. They are normally zero-valent, but may also be in various oxidation states. Such clusters may be unimetallic or bimetallic. The properties of such clusters are quite different from those exhibited by bulk, colloidal metal deposits, at least as regard catalytic activity and selectivity.

Such metal clusters are, however, extremely short lived and unstable under normal conditions. When bulk metals, especially transition metals, are vaporized eg. by resistive heating or electron bombardment, the initially formed vapor is in the monatomic condition. Very rapidly indeed, under normal conditions, the single metal atoms agglomerate into small clusters on a surface, and then very rapidly form bulk, colloidal metal by further agglomeration.

There is accordingly a need for relatively simple and efficient, economically attractive methods for producing supported metal catalysts having the metal deposited thereon in monatomic or small cluster form, and in which the metal deposits are stable in such form.

As used herein, the term "supported metal cluster" refers to metal atoms bonded to a support and weakly or strongly bonded to one another, a significant proportion of the metal atoms being in a reduced or zero-valent state, each supported cluster comprising up to about 100 metal atoms. Such a supported cluster includes any aggregation of two or more metal atoms of the same or different species, regardless of whether they occur in substantially one dimensional form (i.e. a chain of metal atoms), or two dimensional forms (i.e. a planar arrangement), or a three dimensional structure.

PRIOR ART

U.S. Pat. No. 4,292,253 Ozin et al, issued Sept. 29, 1982, describes a process for preparation of a catalyst in which the catalytic metal is present, in significant amounts, in small cluster form bound to a polymer and stable at or near room temperatures. That process involves the generation of vapors of the metal in a high vacuum environment and in the vicinity of a liquid polymer, so that the metals are effectively "trapped" by the polymer in monatomic or small cluster form and prevented from recombining to form colloidal metal.

U.S. Pat. No. 4,552,855 Ozin et al, issued Nov. 12, 1985, describes a process of preparing zeolite-metal catalysts in which the metal is deposited in the cavities of the zeolite in zero-valent, small cluster form to a large extent. These catalysts are prepared by vaporizing the metal under low vapor pressure conditions in the vicinity of an organic liquid solvent such that the metal dissolves in the solvent as a labile solvated zero-valent metal complex, and this complex is contacted with the zeolite so that the complex diffuses into the cavities of the zeolite. Upon subsequent warming, the solvated metal complex decomposes, leaving zero valent small metal clusters in the zeolite cavities.

U.S. Pat. No. 4,569,924 Ozin et al, issued Feb. 11, 1986, describes a process of making carbon-supported metal catalysts where the metal is in small cluster, zero valent form. In this case, the metal is vaporized under low vapor pressure conditions in the vicinity of an organic liquid solvent such as tetrahydrofuran, to form a labile solvated zero-valent metal complex, and this complex is contacted with a carbon support so that the complex diffuses onto the surface of the carbon and also into the pores thereof.

Kiyotaka Matsuo and Kenneth J. Klabunde, J. Org. Chem., 1982 Volume 47, pages 843–848 disclose "solvated metal atom dispersed" (SMAD) catalysts. These are prepared by vaporizing a metal such as nickel in the presence of solvent vapor, such as toluene, at very low temperatures, and condensing and cooling the solvent together with the vaporized metal atoms to generate a frozen matrix of metal atoms and solvent on the walls of a vessel. This frozen matrix is then melted to a liquid slurry in the presence of the catalyst support, so that the catalyst support becomes impregnated with the solvated metal atoms. Whilst the procedure is reported to lead to the production of useful heterogeneous catalysts, there is a loss of control over the nature of the active metal particles during the simultaneous meltdown and impregnation of the support, with the result that the catalyst contains an apparently wide particle size distribution of active metal deposits, and much of the small cluster characteristics of the metal are lost in the process.

U.S. Pat. No. 4,588,708 Klabunde and Imizu, issued May 13, 1986, and associated literature articles of these same authors, describe the extension of this SMAD catalyst procedure to the preparation of bimetallic catalysts.

Choplin et al, "J. Am. Chem. Soc." 1986, Volume 108, pages 4224–4225 describe the preparation of bimetallic catalysts in cluster form, from room temperature stable bimetallic hydrido carbonyl cluster complexes with the supported bimetallic clusters produced on partially hydroxylated magnesia by treatment of the complex with hydrogen at high temperatures.

SUMMARY OF THE INVENTION

It is an object of the present invention to provide a novel process for preparing catalysts and catalyst precursors of catalytically active metal supported on a support, in which the metal is present in substantial amount in monatomic or small cluster form.

It is a further object to provide a method for preparing such catalysts which contain bimetallic or multimetallic supported metal clusters.

It is a further object of the invention to provide novel materials useful as catalysts or catalyst precursors.

In the process of the present invention, ethylene is used to form a complex with individual atoms of the metal or metals which are to be the catalytically active species. These ethylene-metal complexes are formed by vaporization of the metal at low temperatures and pressures in the presence of ethylene gas. Then these complexes are stabilized or protected by an appropriate solvent, e.g. by conducting the metal vaporization in the presence of both ethylene gas and solvent gas. The thus stabilized and protected complexes are now solidified. Then they can be warmed so that excess ethylene is removed therefrom as a gas, to leave a stabilized liquid complex. An appropriate solid support material such as silica or alumina is then impregnated with the ethylene complex in the solvent, to deposit the complex on the surface of the support. Filtering and warming of the slurry so formed separates the solid support bearing the complex on its surface from the excess solvent, and decomposes the complex to leave the metal deposited on the surface of the support initially in monatomic form but also with agglomeration, to give supported metal clusters. The resultant catalytic material is stable at ordinary temperatures.

The formation of the metal-ethylene complex and its stabilization as such by means of an appropriate solvent ensures the formation and deposition on to the support of the metal initially in monatomic form, with subsequent agglomeration to form supported metal clusters. The ethylene complex which is formed with the metal is of defined chemical composition. Such complexes with certain metals such as platinum have been reported previously, but because of their instability are liable to rapid decomposition to allow the formation of colloidal metal. The protection of such ethylene complexes, immediately after their formation at low temperature by means of encapsulation or the like in a solvent, effectively prevents such decomposition and colloidal metal formation. In the process of the invention, such protection is maintained until the metal has been successfully deposited on and effectively anchored to the surface of the support. In this way, colloidal metal formation on the support is effectively prevented.

Thus according to the present invention, there is provided a process of preparing catalyst compositions comprising at least one metal in monatomic or small cluster form, deposited on or in a support, which comprises:

vaporizing metal at low temperature and pressure in the presence of ethylene gas and gaseous solvent, to form a solvent stabilized metal-ethylene complex;

solidifying the stabilized complex;

warming the solid complex to liquid phase, removing excess ethylene, and impregnating a solid support with the solvent stabilized metal-ethylene complex in the liquid phase, to deposit the complex on the support surface; and removing solvent, decomposing the complex and forming monatomic or small cluster metal deposits on the support.

DESCRIPTION OF THE PREFERRED EMBODIMENTS

Figure 1:
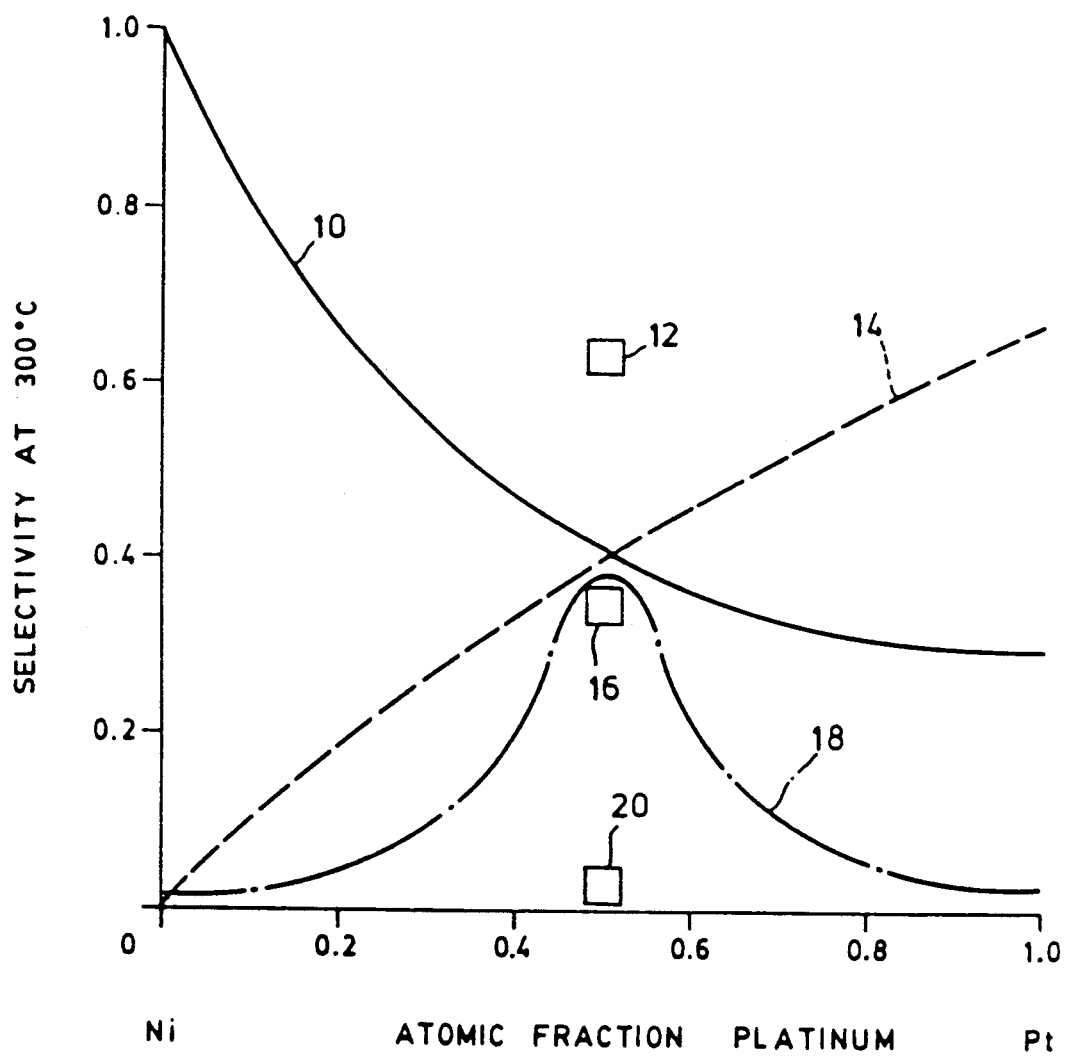
FIG. 1 is a graphical representation of the selectivity of various catalysts in hydrogenolysis, isomerization and dehydrogenation reactions, as described in Example 3.

In the preferred process of the invention, the atomic metal vapors such as platinum vapors are co-condensed at very low temperatures, in the presence of a mixture of gaseous ethylene and vapor of a less volatile, unreactive solvent such as methylcyclohexane (MCH). A thermally labile, two-component (binary) metal-ethylene complex $M(C_2H_4)_n$ is formed. In the specific case of platinum and nickel, n is 3. Whilst it is not intended that the present invention should be limited to or dependent upon any particular theory or mode of action, it appears that the normally very high vapor pressure of ethylene when condensed alone in the presence of metal vapor at low temperatures does not lead to the formation of discrete $M(C_2H_4)_n$ complexes. Instead, colloidal metal formation occurs, through highly competitive pathways, e.g. decomposition and agglomeration. When the ethylene gas is mixed with the vapor of a less volatile, inert solvent, however, the vapor pressure of ethylene at the relevant temperatures is reduced to a level which is conducive to the in situ creation of $M(C_2H_4)_n$ complexes, on condensation with the metal vapor. It is as if the solvent has encapsulated and protected the ethylene, and hence the $M(C_2H_4)_n$ complex, so as to stabilize it against decomposition and consequent metal agglomeration. The complexes can be subsequently melted down and impregnated into a compatible catalyst support, which on warming to room temperature, filtering and pumping to dryness yield ultrafinely dispersed supported metal clusters. Moreover, the simultaneous co-condensation of two different atomically dispersed catalytic metals M and M' with ethylene/inert solvent mixtures at the appropriate low temperatures can be used to prepare $M(C_2H_4)_n/M'(C_2H_4)_m$ mixtures of thermally labile binary ethylene complexes ready for impregnation onto or into an appropriate support, ultimately to yield highly dispersed supported bimetallic clusters.

The present invention thus differs from the prior art, in one aspect, in its use of a normally gaseous solvating agent, i.e. ethylene, in admixture with inert solvent, as opposed to the use of normally liquid solvating agent alone which forms solvated metal complexes of relatively large molecular size. In the present invention, the binary metal ethylene $M(C_2H_4)_n$ carrier for the metal is highly thermally labile, has a small molecular diameter and can be readily deposited onto or into catalyst supports, followed by mild sub-ambient temperature decomposition, to yield highly dispersed supported metal clusters. The oxidation state and size of the clusters depend on the choice of support and metal loading, and the pretreatment of the support. Simple filtration and evacuation removes the carrier, leaving behind the supported metal cluster catalyst in an ultrahighly dispersed, narrow size distribution form.

The conditions of formation of the protected ethylene complex M(C$_2$H$_4$)$_n$, and suitable apparatus for use therein, are generally as described in the aforementioned prior art patents of Ozin et al. The metal is preferably vaporized into a low pressure environment containing both gaseous ethylene and solvent vapor at very low temperatures, e.g. liquid nitrogen temperatures. The complex condenses to a solid at the appropriate temperatures in the metal evaporation vessel. Metal vaporization may suitably be accomplished by electron beam bombardment, resistive heating, inductive heating, cathode sputtering, laser vaporization and the like, to cause localized heating of the bulk metal. Use of one or more electron guns is preferred, with the electron beams being focused on to the target metal reservoirs within the vessel. The vapor pressure within the metal evaporation vessel should be sufficiently low so that the electron guns can operate satisfactorily, eg. $5 \times 10^{-5}$ Torr or less. The evaporative environment should be substantially free from other reactive gases which would otherwise interfere with the metal-ethylene complex formation and stabilization. The apparatus suitably comprises an evacuated flask rotating on an inclined angle, with the metal disposed in a hearth in the flask, in the gaseous ethylene solvent environment. The protected complex is formed and solidified on the walls of the vessel. It can subsequently be warmed in the vessel, after metal vaporization is completed to melt it to liquid phase ready for treatment of the solid support therewith. Suitably, for quantitative deposition of metal, it is preferred that an in situ mass monitor such as a quartz crystal microbalance be employed.

The process of the present invention can be used with all those metals and metal combinations which are known to form binary metal-ethylene complexes. This comprises most of the transition elements, rare earth elements and selected main group elements. It is a particularly advantageous feature of the present invention that bimetallic and multimetallic supported metal cluster can be formed. This can be accomplished by the simultaneous or sequential evaporation of two or more different metals, under conditions of low temperature and pressure into an environment of gaseous solvent and ethylene. Preferably for such purposes, pairs of sets or different metals are chosen which all yield an ethylene complex of similar decomposition temperature. Preferred metals include platinum, nickel, rhodium, cobalt, silver, chromium, titanium, iron, tungsten, molybdenum, palladium etc., all of which are known, useful, heterogeneous catalytic metals and all of which will form complexes with ethylene of well-defined chemical composition, albeit unstable complexes. Methyl- cyclohexane (MCH) is a particularly preferred solvent, although this is merely representative of a variety of preferred solvents. The criteria for a preferred solvent are that it should be inert, compatible with ethylene, but not competitive with ethylene in complex formation, so that it can solvate the metal-ethylene complexes. Such preferred solvents include alkanes, ethers and freon, for example pentanes, hexanes, heptanes, tetrahydrofuran and the like.

When the metal-ethylene complexes, protected with solvent, have been prepared, eg. at 77° K., the next step is to melt the complex to the liquid state. At the same time some ethylene is lost. The resultant product is M(C$_2$H$_4$)$_n$ effectively dissolved in solvent such as MCH. Now it can be used to impregnate an appropriate support to form a useful catalytic material. Appropriate supports are alumina and silica. Then the material is allowed to warm to room temperature under vacuum, so that residual ethylene and solvent are removed from the catalyst. The resultant supported metal clusters are essentially free from hydrocarbon residues. The characteristics of the resultant supported catalysts can be adjusted by appropriate pre-treatment of the support prior to impregnation with the M(C$_2$H$_4$)$_n$ solution.

The genesis and growth of a metal aggregate under the mild conditions of the process of the present invention can be envisaged to depend on the metal, ligand, solvent, concentration, temperature and support material. One expects that the degree of surface hydroxylation of the support, and the acid/base properties thereof, will play a role in the capture and anchoring of metal atoms, as well as the rate and extent of subsequent accretion reactions of initially formed surface atoms and clusters. Factors such as precursor concentration, solvent type, support type and pretreatment, and impregnation temperature will allow control of the metal/support deposition kinetics as well as the interfacial agglomeration dynamics.

In the case of alumina, for example, this has acidic surface characteristics, with Bronsted sites capable of delivering a proton to provide an anchoring site for an atom, and Lewis sites to which atoms can anchor. Silica is less acidic, but still has Bronsted sites. Control of the number of surface sites capable of providing anchorage for incoming groups such as metal atoms can be exercised by heating the support at various temperatures, under vacuum. The potential anchoring sites are commonly occupied by water of hydration, which is removed to a greater or lesser extent by such treatment. Presence of excessive amounts of water will lead to undesirable oxidation of the deposited metal clusters. Heat treatment also modifies the hydroxyl surface groups, to affect their anchoring characteristics towards the metal clusters, and to affect the numbers of them, i.e. concentration of hydroxyl per unit of support surface area. The degree of surface hydroxylation of silica or alumina is thus controllable by carefully adjusted calcination and thermal vacuum treatments of unimpregnated silica or alumina.

When the metal complex contacts the prepared support surface, the metal reacts with and binds to a surface OH group with resultant displacement of the proton therefrom. The metal atom so bonded is firmly held in place, and can act as a nucleation center for other incoming metals. When the metal complex contains two or more metal species, the more readily oxidized species will bond to the surface hydroxyl. In the practice of the present invention, the pre-treated support is preferably contacted with a liquid metal complex at low temperatures, e.g. 190° K., and allowed to stand in contact therewith for 4–5 hours, with slow warm-up, under stirring, to ambient temperatures. As this occurs, the solvent-metal-ethylene complex decomposes, so that the resultant metal atoms attach to the support surface. The excess liquid is filtered off. It is generally colorless, indicating that it is substantially metal-free solvent. The solid product is conveniently dried under vacuum to remove residual solvent and ethylene resulting from the complex decomposition. Then the resultant material has metal clusters deposited on its surface or in its pores, in a form in which they are stable against agglomeration to colloidal or bulk metal at room temperatures, and ready for use as catalysts or in other appropriate applications. Physico-chemical characterization procedures such as XPS (X-ray photoelectron spectroscopy), EPR (electron paramagnetic resonance) analysis, FMR (ferromagnetic resonance) analysis, chemisorption, microcalorimetry, FTIR (Fournier Transform Infrared Spectroscopy) of probe chemisorbed molecules, high resolution CTEM (ie conventional transmission electron microscopy), and STEM-EDAX (scanning transmission electron microscopy - energy dispersive X-ray analysis) have shown that the process of the present invention yields oxide supports bearing monatomic or small cluster metal of very narrow size distribution and very small sizes (usually less than 10 Å). It has also shown that truly bimetallic clusters are formed, from complexes of two different metals with ethylene and solvent.

Thus the use of gaseous ethylene as a carrier of zero valent metal atoms, under extremely mild conditions, one atom at a time to the surface sites or internal pore regions of a catalyst support constitutes a novel method for preparing ultra finely divided supported unimetallic and bimetallic clusters with dispersions of unity. In addition, the small molecular diameter of species such as $Ni(C_2H_4)_3$ and $Pt(C_2H_4)_3$, less than 6 Å, makes them ideally suited for impregnating microporous supports such as zeolites, especially the medium pore pentasil types, like ZSM-5, whose ten ring channel openings are around 6Å in diameter.

In the experimental work which is reported below, the process of metal cluster growth on an oxide support using ethylene metal complexes prepared as described above is practiced. To enable studies and characterizations of the metal clusters to be performed, the number of experimental variables was reduced to a minimum. Nickel and platinum were chosen as the metals, and were carried as their tris-ethylene zero valent metal complexes in methylcyclohexane solutions, onto a high surface area silica or alumina materials. The metal concentrations in solution, total loading and impregnation temperatures were all held constant, so that the only variable was the degree of surface hydroxylation of the silica and alumina samples. This was attained by careful calcination and thermal vacuum treatments of the unimpregnated silica and alumina, and resulted in samples having surface hydroxyl concentrations ranging from one to five hydroxy groups per 100 Å$^2$.

EXAMPLE 1

A previously calcined silica support material (Davidson 952) was pretreated in 4 gram lots:

A—200° C. for 3 hours under vacuum;
B—400° C. for 3 hours under vacuum;
C—600° C. for 3 hours under vacuum;
D—725° C. (nickel) and 800° C. (platinum) for 3 hours under vacuum.

Tris-ethylene nickel(0) and tris-ethylene platinum(0) were separately generated from nickel and platinum atoms by co-condensation with ethylene/methylcyclohexane mixtures at −196° C. In each case, electron guns equipped with electron emitting filaments (thoriated tungsten wire) were used, the electron beams emitted therefrom being focussed onto the respective pre-weighed metal sample contained on a water cooled copper target hearth. The electron beam bombardment and evaporation took place in an evacuated rotating flask into a low vapor pressure environment containing ethylene and methylcyclohexane vapors, cooled under liquid nitrogen. The amount of metal vaporized was monitored using a quartz crystal microbalance. The rate of metal vaporization was maintained so that the vapor pressure inside the reactor did not exceed about $3 \times 10^{-5}$ Torr Each tris-ethylene metal complex so formed was transferred anaerobically at −80° C., in roughly equal proportions, to four impregnation vessels each containing four grams of the pretreated silica support material A, B, C and D above. The transfer was accomplished by bring the stationary reaction vessel to atmospheric pressure under argon, whilst the impregnation vessels were evacuated. The slurries so formed were kept under magnetic stirring at −80° C. for 5-6 hours, and then allowed to warm to room temperature overnight. The liquid phase was then filtered off, and the residue was pumped through a liquid nitrogen trap to establish the total amount or reaction product transferred to each impregnation vessel.

The filtrates were all clear and colorless, demonstrating that all of the deposited metal atoms had been transferred from the solution phase to the support material, via the intermediary of the labile $M(C_2H_4)_3$ complexes. The calculated nominal loading vaporized, with an appropriate correction factor which is related to the vaporization source characteristics, for the four nickel and four platinum samples, are presented in Tables 1 and 2 respectively. A neutron activation technique, involving primary irradiation of the samples by energetic neutron from a slow poke reactor to excite radioactive decay of the metal, and comparing the scintillation rate against that emanating from a standard of the same metal of known concentration, and a plasma emission spectroscopic technique, using an argon plasma excitation source to induce atomic emission and comparing the intensities of spectral lines of the metal with a calibration standard, were used to obtain quantitative measurements. These are also reported in Tables 1 and 2. After drying, all samples were transferred anaerobically into glass ampoules, and sealed under vacuum.

TABLE 1

| | | Nickel Loading by % Weight | | |
|---|---|---|---|---|
| Reference | Support Sample | Nominal | Plasma Emission | Neutron Activation |
| EMR - 19a | A | 1.7 | 0.8 | 0.6 |
| EMR - 19b | B | 2.0 | 1.0 | 0.7 |
| EMR - 19c | C | 1.7 | 0.9 | 0.6 |
| EMR - 19d | D | 2.1 | 0.9 | 0.7 |

TABLE 2

| | | Platinum Loading by % Weight | | |
|---|---|---|---|---|
| Reference | Support Sample | Nominal | Plasma Emission | Neutron Activation |
| EMR - 20a | A | 1.4 | 1.2 | 1.3 |
| EMR - 20b | B | 2.4 | 1.8 | 1.7 |
| EMR - 20c | C | 2.2 | 1.7 | 1.6 |
| EMR - 20d | D | 2.4 | 1.8 | 1.7 |

The pretreatment techniques for the silica supports were according to SINDORF et al, J. Phys. Chem., 87, 5516 (1983), and the surface hydroxyl concentration between them was varied from one to five hydroxyl groups per 100 Å$^2$.

The materials so formed were studied by high resolution transmission (HRTEM) electron microscope imaging, and microphotographs of them were thus obtained, with excellent contrast. From the microphotographs, the average particle size diameters could be determined, as well the maximum particle sizes. In none of the eight samples was the maximum particle size greater than 10

Å. The average metal particle sizes for the eight samples are given below in Table 3.

TABLE 3

| Reference Sample | Pretreatment Temperature (°C.) | Average Particle Size (Å) |
| --- | --- | --- |
| EMR - 19a | 200 | 5.6 |
| EMR - 19b | 400 | 3.8 |
| EMR - 19c | 600 | 3.9 |
| EMR - 19d | 800 | 5.8 |
| EMR - 20a | 200 | 5.0 |
| EMR - 20b | 400 | 6.9 |
| EMR - 20c | 600 | 7.9 |
| EMR - 20d | 725 | 6.0 |

From this data it is concluded that there is no significant variation in resultant metal particle size with pretreatment temperature. The average size of the particles for nickel is slightly different than that for platinum.

EXAMPLE 2

By following the procedures described above. bimetallic metal cluster particles, of platinum and nickel were prepared, and deposited on the various pretreatment supports as previously described.

For this purpose, two target hearths were used, each containing a preweighed amount of one of the metals, and two electron guns, as previously described, were used, each focussed on a specific target hearth. In a first experiment, platinum and nickel at a 1:1 ratio were deposited, and in a second experiment, platinum and nickel at a 3:1 ratio were deposited (atomic ratios in each case). HRTEM particle size analysis of the resultant products was conducted as before, to measure the average particle sizes of the bimetallic clusters so formed. Again, no particle sizes greater than 10 Å were detected. The results of the average particle size determinations are given below in Table 4.

TABLE 4

| Reference | Pt/Ni atomic ratio | Pretreatment Temperature (°C.) | Average particle Size (Å) |
| --- | --- | --- | --- |
| 21 A | 1:1 | 200 | 7.2 |
| 21 C | 1:1 | 600 | 6.5 |
| 22 A | 3:1 | 200 | 6.1 |
| 22 C | 3:1 | 600 | 6.0 |

These results show that the particles are in the same size range as those formed from nickel and platinum unimetallic materials. Because of its more ready oxidation, nickel would be expected to deposit first onto the support surface, with bimetallic clusters of nickel and platinum atoms then forming around the initially deposited nickel atom.

EXAMPLE 3

Unimetallic and bimetallic catalysts produced according to the present invention, on alumina supports, were evaluated for alkane hydrogenolysis, dehydrogenation and isomerization chemistry, involving such reagents as ethane, propane, n-butane, methycyclopropane, methycyclopentane and ethylcyclohexane. They were found to be very active and selective under normal conditions for conducting such heterogenous phase catalytic reactions, established for known metal supported catalysts.

More specifically, n-butane was subjected, using these catalytic materials, to dehydrogenation to convert it to butene, to isomerization to convert it to isobutane, and to hydrogenolysis in the presence of hydrogen, to convert it to methane and other lower alkanes (i.e. cracking). Nickel catalysts are known to be effective in hydrogenolysis, but substantially ineffective in both isomerization and dehydrogenation. Platinum catalysts by contrast are effective in both hydrogenolysis (to a lesser extent) and isomerization (to a greater extent) but also substantially ineffective in dehydrogenation. Accordingly, bimetallic catalysts according to the present invention, as well as unimetallic catalysts, were evaluated in these various reactions. For comparison purposes, physical mixes of the two metals supported on an alumina support were also used, in the same reactions under the same conditions.

FIG. 1 attached hereto is a graphical presentation of the results so obtained, namely a plot of the atomic fraction of the various metals against the selectivity of the respective catalyst towards the chosen one of the three aforementioned butane reactions. Curve 10 is the hydrogenolysis reaction. It can be seen that the selectivity towards methane production is substantially total when the catalyst contains nickel only, but decreases to about 0.3 as the atomic fraction of platinum in the bimetallic cluster catalyst approaches unity. Area 12 is the selectivity for this reaction obtained under the same conditions when the catalyst comprises a physical mixture of platinum and nickel supported cluster catalysts, atomic fraction of each 0.5. The fact that it is so far off the curve 10 indicates that the catalyst yielding the results of curve 10 is something other than a mere physical mixture of the two metals, i.e. a truly bimetallic cluster catalyst, exhibiting cooperative interaction between the two different atomic components rather than unimetallic clusters separately deposited on the surface of the same support, displaying just additive effects.

The broken curve 14 represents the isomerization reaction results, and starts from an effective zero selectivity when the catalyst is wholly nickel, rising to about 0.7 selectivity when the catalyst is wholly platinum. Area 16 represents the physical mixture of nickel and platinum cluster catalysts, at equal atomic fractions, and is close to but does not lie on curve 14.

Chain dot curve 18 represents the dehydrogenation reaction. Area 20 represents the selectivity obtained under the same conditions when a physical mixture of equal atomic fractions of platinum and nickel cluster catalyst is used. This area is not close to the curve 18, and clearly demonstrates that something other than a physical mixture of metals is formed by the process of the invention namely a bimetallic cluster catalyst. This dramatically demonstrates that the bimetallic cluster catalysts of the present invention are significantly and substantially different from mere physical mixture unimetallic catalysts, in showing a reasonable selectivity towards the dehydrogenation reaction at equal atomic fractions of the two metals, in contrast with the physical mixtures.

We claim:

1. A process of preparing catalyst compositions comprising at least one metal in monatomic or small cluster form, surface deposited on or in a support, which comprises:

vaporizing metal at low temperature and pressure in the presence of ethylene gas and gaseous solvent, to form a solvent stabilized metal-ethylene complex;

solidifying said stabilized complex;

warming the solid complex to liquid phase, removing excess ethylene, and impregnating a solid support with the solvent stabilized metal ethylene complex in the liquid phase, to deposit the complex on the support surface; and removing solvent, decomposing the complex and forming monatomic or small cluster metal deposits on the support.

2. The process of claim 1 wherein the solvent removal complex decomposition and metal deposition on the support are accomplished by filtering and warming the impregnated support 3. The process of claim 2 wherein the support is an oxide support or a zeolite.

4. The process of claim 3 wherein the support is silica or alumina.

5. The process of claim 1, wherein the metal is nickel.

6. The process of claim 1, wherein the metal is platinum.

7. The process of claim 1 wherein in the vaporizing metal step, platinum and nickel are vaporized together, whereby a bimetallic cluster is formed.

8. The process of claim 2 wherein said metal is selected from the group consisting of platinum, nickel, rhodium, cobalt, silver, chromium, titanium, iron, tungsten, molybdenum and palladium.

* * * * *